Dec. 28, 1926.
L. O. LUCKA ET AL
1,612,590
FLOUR DUMP
Filed Jan. 21, 1926      2 Sheets-Sheet 2
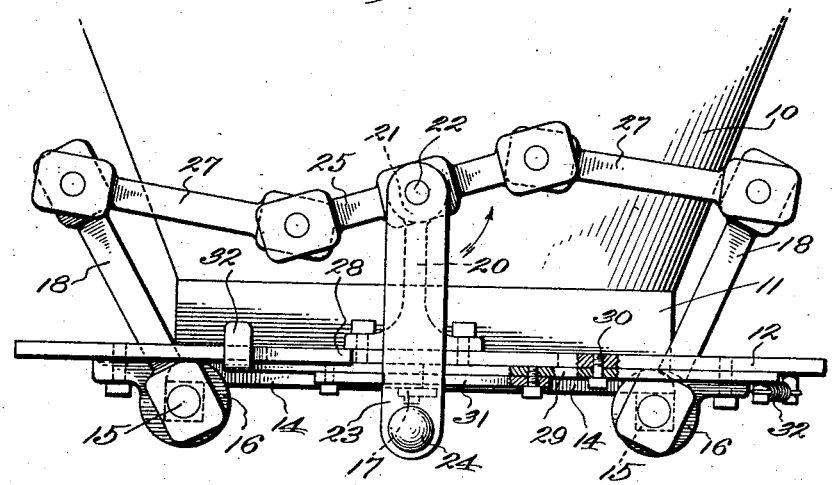
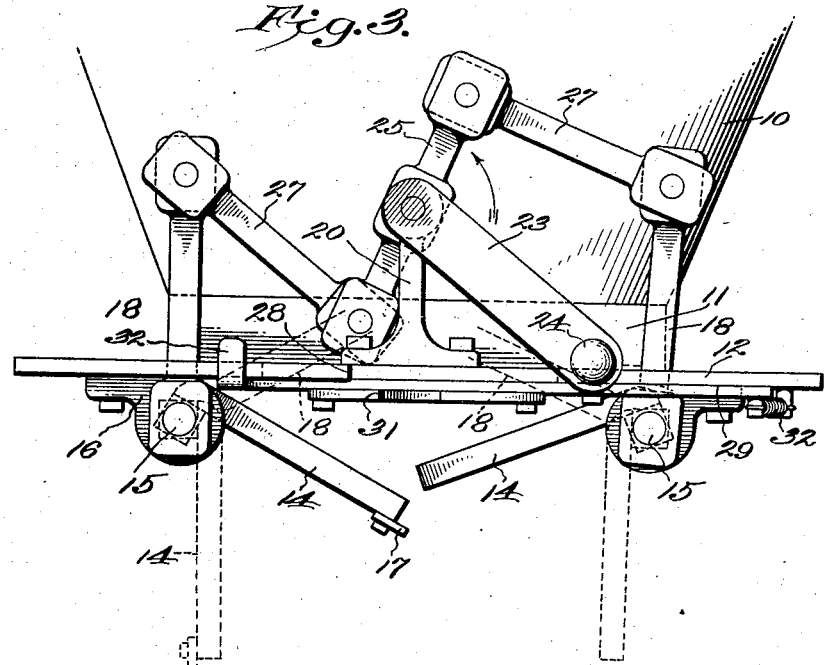

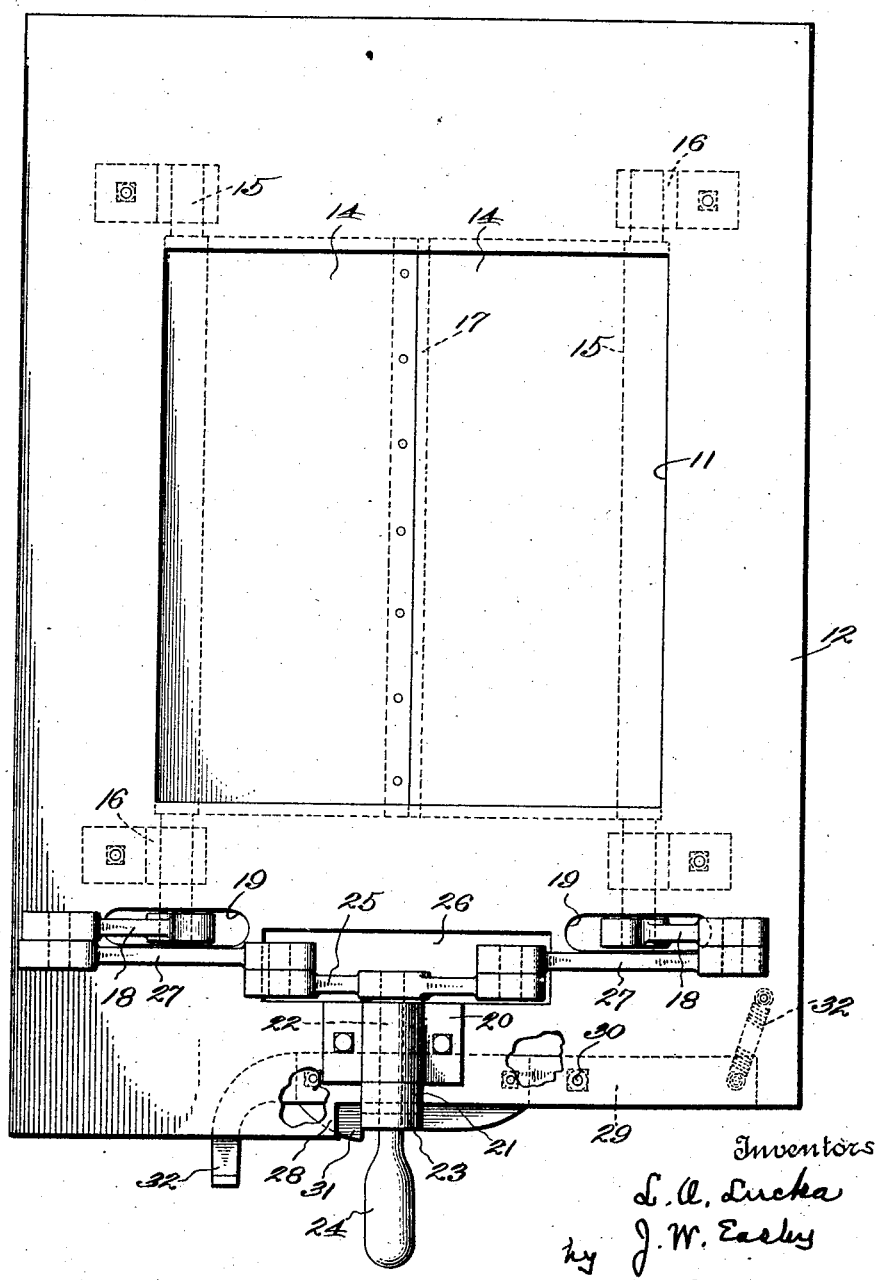

Patented Dec. 28, 1926.

1,612,590

UNITED STATES PATENT OFFICE.

LOUIS O. LUCKA AND JOHN W. EASLEY, OF DECATUR, ILLINOIS.

FLOUR DUMP.

Application filed January 21, 1926. Serial No. 82,864.

This invention relates to certain improvements in flour dumps; and the nature and objects of the invention will be readily recognized and understood by those skilled in the art in the light of the following explanation and detailed description of the accompanying drawings illustrating what we at present consider to be the preferred embodiment or mechanical expression of our invention from among various other forms, arrangements, combinations and constructions of which the invention is capable within the spirit and the scope thereof.

With the bins or hoppers for flour employed in connection with dough mixers and such like machines used in bakeries, considerable difficulty is experienced with the closures for such bins and hoppers by which the flour discharge therefrom is controlled, due to the vibration and jars caused by operation of the closures, which result in the creation of objectionable dust from the flour, as well as injury or possible inaccuracies in the scales or weighing apparatus generally operatively combined or associated with such bins or hoppers. Further problems and difficulties arise from the desirability of quickly opening and closing the bins or hoppers to discharge flour therefrom and to cut off or stop the discharge with a minimum possibility of the closures or their operating mechanism sticking or clogging with flour, and of the escape of flour with the bin or hopper closed against discharge.

Therefore, one of the main aims of the present invention is to provide a flour dump for flour bins and hoppers in which vibration is reduced to a minimum and which can be quickly opened or closed to discharge or cut off discharge thereof from a flour bin or hopper with the possibility of failure in the dump due to clogging by flour practically eliminated.

A further object of the invention is to provide a discharge or dump for flour and the like bins or hoppers, which embodies swinging closures and a positive action operating mechanism therefor formed of a series of links and levers to produce a smooth rapid operation of the closures to and from discharge position with a minimum of vibration and which in closed position are substantially locked against accidental displacement to prevent leakage or spilling of flour from the bin or hopper.

Another object of the invention is the provision of a flour bin or hopper dump embodying the foregoing characteristics which is of simple design and construction readily installed on a flour bin or hopper at relatively low cost and which is efficient in operation requiring a minimum of care in use.

With the foregoing general objects and certain other objects and results in view, which other objects and results will be readily recognized by those familiar with the art from the following description, the invention consists in certain novel features in construction and in combinations and arrangements of elements, as will be more fully and particularly referred to and specified hereinafter.

Referring to the accompanying drawings in which similar reference characters refer to corresponding parts throughout the several figures thereof:

Fig. 1, is a view in top plan of the bottom or base wall of a flour bin or hopper having a discharge opening therethrough with the closures and operating mechanism therefor of the invention mounted thereon, the closures being shown in closed position.

Fig. 2, is a view in side elevation of a flour bin with the closures and operating mechanism in closed position, a portion only of the bin being shown.

Fig. 3, is a view similar to Fig. 2 with the closures and operating mechanism in partially opened position.

While the invention is primarily intended for use with bins or hoppers for flour as a solution of the hereinbefore mentioned problems and difficulties, it is not limited to this use but is of general application for the discharge of material from receptacles, particularly material of the fine or powdered types, as will be readily recognized and appreciated by those familiar with the discharge of materials from bins or the like receptacles.

A possible mechanical embodiment of the principles and features of the invention is disclosed in the accompanying drawings by way of example and not of limitation, as applied to and installed on a flour bin or hopper 10 (see Figs. 2 and 3) of the type employed in connection with dough mixing or the like machinery and operatively associated or combined with weighing scales (not shown) in the usual manner well understood in the art. The hopper or bin 10 is provided with a bottom throat 11 forming a lower discharge opening to and through the base or bottom plate 12, which extends laterally from and around the lower end of the bin 10 and discharge throat 11, forming in effect a platform for the bin. In the use of the bin, it is necessary to discharge flour therefrom at intervals through the discharge throat and plate 12 and to cut off discharge therefrom at other times.

According to the invention, a pair of vertically swinging closures or doors 14 are mounted on the bottom plate 12 adjacent opposite sides of the discharge opening for swinging upwardly to position across and closing the bin, and for downward movement to substantially vertical position removed from and completely opening the bin discharge. Each door 14 is fixed to a shaft 15 which is mounted in journal boxes or suitable bearings 16 at opposite ends of the hopper discharge opening and fixed to the bottom plate 12 on the under side thereof, so that the door is swingable on a horizontal axis along its outer edge adjacent and along a side of the opening from the hopper. Each door in raised closed position occupies half the discharge opening with their free edges meeting and each extends at its ends and outer sides a slight distance beyond the opening as shown by dotted lines in Fig. 1. In closed position the doors fit tightly against the under side of the plate 12 at their extended portions, and one of the doors 14 is provided with a lip or shoulder 17 along its free edge to fit over and form a seal with the edge of the opposite door in closed position.

Operating mechanism is provided in the example hereof manually operable although not so limited for opening and closing the doors 14 to permit discharge of flour, or cut off discharge thereof, from the bin 10. The door shafts 15 are extended at adjacent ends thereof a distance beyond the journals or bearings 16 and vertically disposed arms 18 are fixed thereon for rotation therewith. The arms 18 are extended upwardly through elongated slots or openings 19 (see Fig. 1) formed through the plate 12 to permit the arms to freely oscillate or rock through an arc of the required length. Adjacent the outer edge of the bottom or base plate 12, intermediate the arms 18, a shaft hanger or standard 20 is fixed thereon and extending upwardly a distance therefrom with a horizontally disposed shaft bearing 21 on the upper end thereof substantially parallel with the door shafts 15 a shaft 22 is rotatably mounted in and extending through the bearing 21, and a crank arm 23 is fixed on the outer end of shaft 22 for rotation therewith. The arm 23 is disposed for rotation in a vertical plane spaced outwardly from the edge of plate 12 so as to clear the same, as the arm is of a length in depending position to extend a distance below the plate, as will be clear by reference to Fig. 2 in particular. An operating handle 24 is fixed on the lower end of arm 23 extending outwardly therefrom for manual turning or swinging of the arm.

The crank arm 23 and shaft 22 are operatively coupled with the arms 18 so as to simultaneously actuate the same to swing the closures or doors 14 to open and closed position. A double throw cross arm is fixed on and extending across the inner end of the shaft 22 for rotation therewith and an elongated opening 26 (see Fig. 1) is formed in the bottom plate 12 of the bin 10 to permit of free rotation of the cross arm 25 without interference from the plate or engagement thereof by the ends of the cross arm in operation. Cross arm 25 is mounted on shaft 22 in position transversely with respect to the crank arm 23 at the outer end of the shaft, so that with arm 23 in depending position, the cross arm 25 is in substantially horizontally disposed position, as shown by Fig. 2. The opposite ends of cross arm or crank 25 are operatively coupled or connected with the door operating arms 18 by the links or levers 27 pivotally coupled therebetween, respectively. The arrangement and relative position of links 27, is such that with the doors 14 in closed position and arms 18 in vertical position inclined outwardly, the cross arm 25 is in its substantially horizontal position and connected to the arms 18 by the links 27 which are in their extended position, while the crank arm 23 is in vertical position depending from shaft 22. This closed position of the doors 14 and operating mechanism is shown by Figs. 1 and 2 of the drawings.

In the example hereof, the base plate 12 of bin or hopper 10 is projected or extended at one side of the shaft hanger or standard 20 to form the projecting shoulder 28 providing a stop within the path of rotation of crank arm 23 to prevent its rotation in that direction, although the invention is not limited to the provision of such a stop. In order to lock and maintain the crank arm 23 in its depending position closing doors 14, a spring actuated latch or catch is provided which in the present instance embodies a plate 29 pivotally mounted on a pin or axis 30 intermediate its ends, below the base plate 12 along the edge thereof adjacent standard 20 and extending past the path of rotation of crank arm 23. The pivotally mounted plate 29 is provided with a projecting notched catch 31 within the path of arm 23 and adapted to receive and hold the arm in depending position, as will be clear by reference to Figs. 1 and 2. A spring 32 is connected to one end of the plate 29 and normally maintains the same in position with catch 31 in the path of arm 23 for receiving the same. At the opposite end the latch forming plate 29 is formed with an outwardly and upwardly extending finger 32 by which the plate and catch can be swung inwardly to position releasing arm 23 therefrom.

In operation, with the doors 14 in closed position and the operating crank arm 23 in depending position locked by latch or catch 29—31, when it is desired to open doors 14 and discharge a quantity of flour therefrom, the latch 31 is swung to releasing position by pressing finger 32 inwardly, and the arm 23 is then swung or rotated upwardly in the direction shown by the arrows in Figs. 2 and 3. Rotation of arm 23 rotates shaft 22, and the cross arm 25 is rotated to swing the opposite ends thereof in a direction away from the door arms 18, respectively adjacent thereto and to which arms the ends of cross arm 25 are connected by the links 27, respectively. Thus the door arms 18 are swung or rocked inwardly toward each other to swing the shafts 15 and doors 14 mounted thereon, downwardly to open position as shown in Fig. 3. Continued rotation of crank arm 23 in the direction shown, through the medium of cross arm 25 and links 27, rocks the door arms further inwardly and downwardly until the doors 14 are in fully opened depending position as shown in dotted outline in Fig. 3. With the doors in open position, reverse rotation of arm 23 from its upward, open position to downward position, swings the doors upwardly into the closed position shown in Fig. 2, and as the arm 23 reaches depending door closing position, it snaps into and is received by the latch or catch 29—31 to hold the same into door closing position.

The invention thus provides a dump mechanism for bins and hoppers in which swinging closures are actuated by operating mechanism so designed and arranged that the doors are not only positively and quickly swung to and from closed position, but are so swung with a minimum of vibration without material shock or jar to the bin or hopper. This is an important consideration with flour bins to eliminate the creation of dust from jarring or vibrating a bin, as well as with such bins where they are employed in operative connection with more or less delicate weighing apparatus on which the effect of vibration is injurious and tends to inaccurate operation of such apparatus. It will be further noted that due to the mounting of the swinging doors or closures 14 they are swung to open position completely removed from and unobstructing the discharge from the bin or hopper, and in closed position fit tightly against the bin base plate 12 and extend completely over and across the discharge opening to effectively seal the same and prevent escape or leakage of flour or other material in the bin. The arrangement and construction of the operating mechanism with the double-throw cross arm 25 and links 27 connecting the same with the closure arms 18, is such that extremely smooth actuation of the doors is obtained, and in open position thereof, as well as in closed position the links and double throw arm tend to lock and hold the doors against accidental displacement thereof.

It is also evident that various changes, modifications, variations might be resorted to without departing from the spirit and scope of our invention and hence we do not wish to limit ourselves to the exact and specific disclosures hereof.

Desiring to protect our invention in the broadest manner legally possible, what we claim and desire to protect by Letters Patent of the United States, is:

1. In combination with a flour bin having a bottom discharge and a base plate projecting laterally therefrom adjacent the lower end thereof, swinging doors pivotally mounted along opposite sides of said discharge to said base plate for upward movement extending across and closing said discharge and for downward movement to positions removed from and unobstructing the discharge, and operating means for said doors mounted on the laterally projecting portion of said base plate removed from the bin and the discharge therefrom.

2. In combination, a flour bin having a bottom discharge opening, a base plate surrounding and extending laterally from said opening through which the bin discharges, swinging doors pivotally mounted on horizontal axis along opposite sides of said opening and spaced outwardly therefrom, said doors in closed position swung upwardly to extend completely over and across said discharge opening and in open position swung downwardly to vertical positions at opposite sides of and removed from said opening, and operating means for opening and closing said doors mounted on the projecting portion of said base plate adjacent one end of said doors and completely removed from and unobstructing said bin or the discharge opening therefrom.

3. In combination with a bin having a bottom discharge opening, swinging closures mounted on shafts along opposite sides of the discharge opening, said closures in closed position swung upwardly and extending over and across said opening to completely close the same, arms fixed to adjacent ends of said shafts, a rotary member mounted intermediate said arms, and links operatively connecting said shaft arms with opposite sides, respectively, of said rotary member whereby rotation of said member in one direction will swing said arms to simultaneously open said closures with the links and rotary member in substantially laterally alined position, and in the opposite direction will swing said arms to simultaneously close said closures with the links and rotary member in substantially longitudinally alined position.

4. In combination with a bin having a bottom discharge opening, a base plate surrounding and disposed horizontally from said opening, shafts rotatably mounted at the under side of said plate along opposite sides of the discharge opening, doors fixed to said shafts for swinging movement to closed position extending over and across said opening to completely close the same, and to open position swung downwardly removed from said opening, arms fixed to adjacent ends of said shafts, respectively, extending upwardly through said base plate, and means carried by the base plate for simultaneously swinging said arms inwardly toward each other to swing said doors upwardly to closed position, or outwardly from each other to swing the doors downwardly to position removed from said discharge opening.

5. In combination with a bin having a bottom discharge opening, a base plate surrounding said opening, shafts rotatably mounted beneath said plate along opposite sides of the discharge opening, doors fixed to said shafts for swinging movement thereby to and from position across and closing said opening, vertically disposed arms fixed to adjacent ends of said shafts, respectively, and extending upwardly through said base plate, an operating shaft mounted on said base plate in position thereabove intermediate said arms, a cross arm fixed to said operating shaft, links pivotally connected between the opposite ends of said cross arm and said shaft arms, respectively, a crank handle fixed to said operating shaft for rotating the same, and spring controlled latch mechanism for engaging said crank handle to maintain the same in position with said doors swung to closed position.

6. In combination with a bin having a bottom discharge opening, a horizontally disposed base plate surrounding said opening, shafts rotatably mounted beneath said plate along opposite sides of the discharge opening, doors fixed to said shafts for swinging movement thereby to and from position across and closing the opening, vertically disposed arms fixed to adjacent ends of said shafts, respectively, and extending upwardly through openings in the base plate, an operating shaft mounted intermediate said arms above the base plate, a cross arm fixed to said operating shaft, links pivotally connected between the opposite ends of said cross arm and said shaft arms, respectively, and means for rotating said operating shaft and cross arm to rock said shaft arms and simultaneously swing said doors to position opening or closing the bin discharge.

7. In combination with a bin having a bottom discharge opening, shafts rotatably mounted along opposite sides of said opening, doors fixed to said shafts for swinging movement thereby to and from position across and closing the discharge opening, vertically disposed arms fixed on adjacent ends of said shafts, respectively, an operating shaft mounted intermediate said shaft arms, a cross arm fixed to said operating shaft, links pivotally connecting the opposite ends of said cross arm with the ends of said shaft arms, respectively, and a crank for rotating said operating shaft and cross arm for simultaneously swinging said doors downwardly to position removed from and opening the bin discharge, or upwardly to position across and closing said opening.

Signed at Decatur, Illinois, this 19th day of January, 1926.

LOUIS O. LUCKA.
JOHN W. EASLEY.